United States Patent [19]
Enomoto et al.

[11] Patent Number: 6,135,752
[45] Date of Patent: Oct. 24, 2000

[54] FORMING DIE AND MANAGING METHOD THEREOF

[75] Inventors: Akio Enomoto, Chita-Gun; Shinji Tada; Hiroshi Kashiwagi, both of Nagoya, all of Japan

[73] Assignee: NGK Insulators, Ltd., Nagoya, Japan

[21] Appl. No.: 09/184,756

[22] Filed: Nov. 2, 1998

[30] Foreign Application Priority Data

Jan. 8, 1998 [JP] Japan .................................. 10-001952

[51] Int. Cl.⁷ .................................................. B29C 33/30
[52] U.S. Cl. ..................... 425/192 R; 425/116; 425/195; 249/139
[58] Field of Search ............................... 425/116, 192 R, 425/195; 249/139

[56] References Cited

U.S. PATENT DOCUMENTS 5,523,038   6/1996   Kunieda et al. ..................... 425/116
5,723,155   3/1998   Hayakawa et al. ..................... 425/116

FOREIGN PATENT DOCUMENTS 59-218228   12/1984   Japan .

*Primary Examiner*—James P. Mackey
*Attorney, Agent, or Firm*—Burr & Brown

[57] ABSTRACT

A forming die including of a holder having an upper portion and a lower portion, each portion having a main substrate extending in a first longitudinal direction. A fixing substrate is located on one end of the main substrate and a movable substrate is located on an opposite end of the main substrate and is movable along the main substrate in the first longitudinal direction. A plurality of die forming segments are situated between the movable substrate and the fixing substrate. Tie rods extend along the main substrate outside the periphery of the plurality of die forming segments, and connect the movable substrate and the fixing substrate to one another.

6 Claims, 5 Drawing Sheets

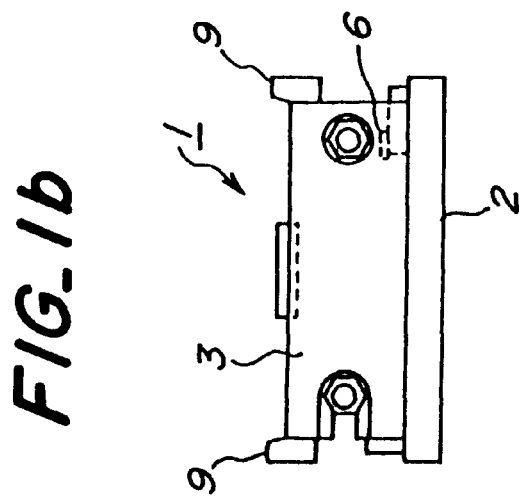
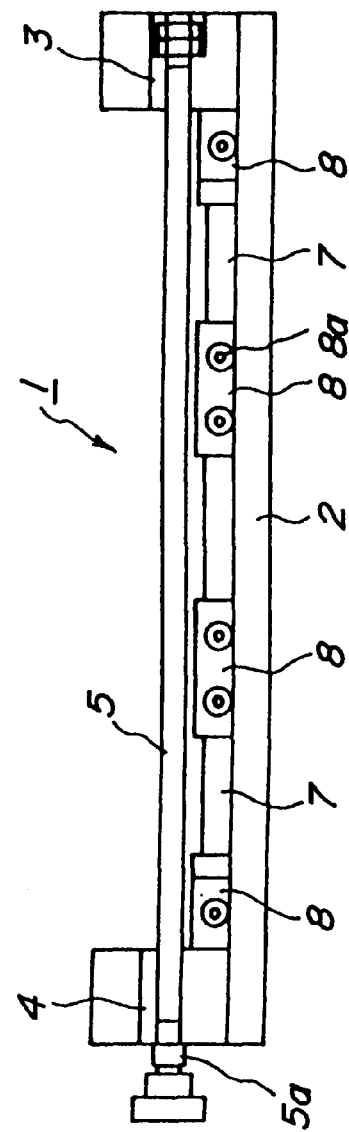

FIG_2a
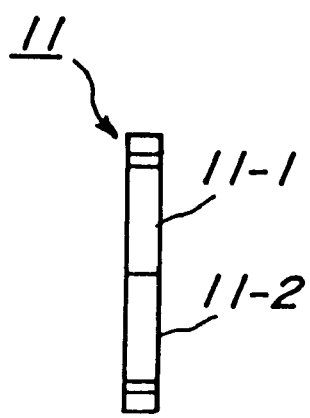
FIG_2b
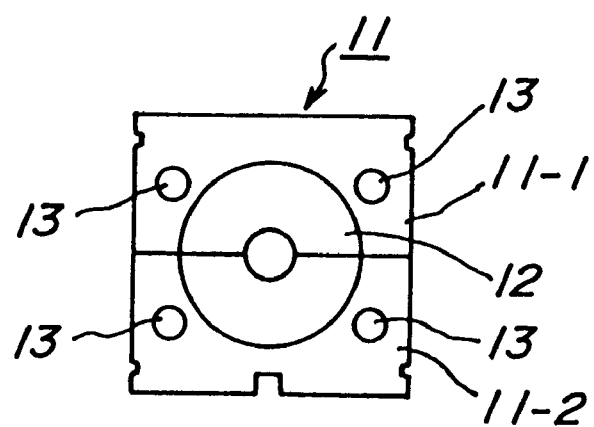

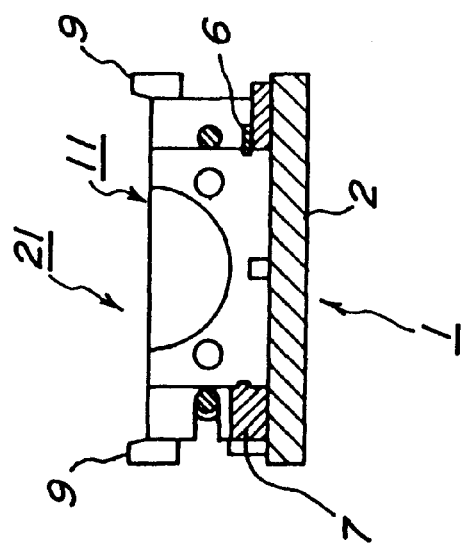
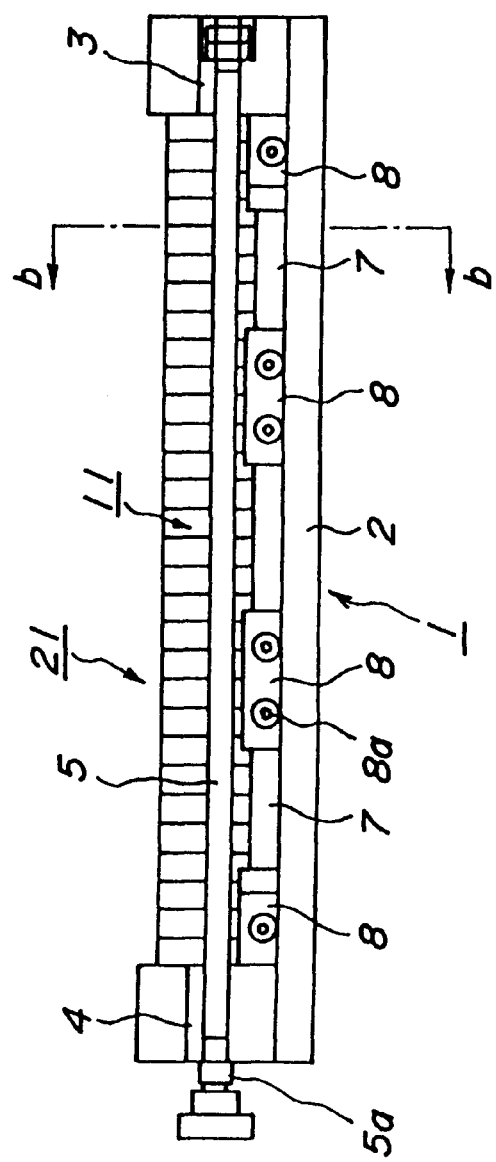

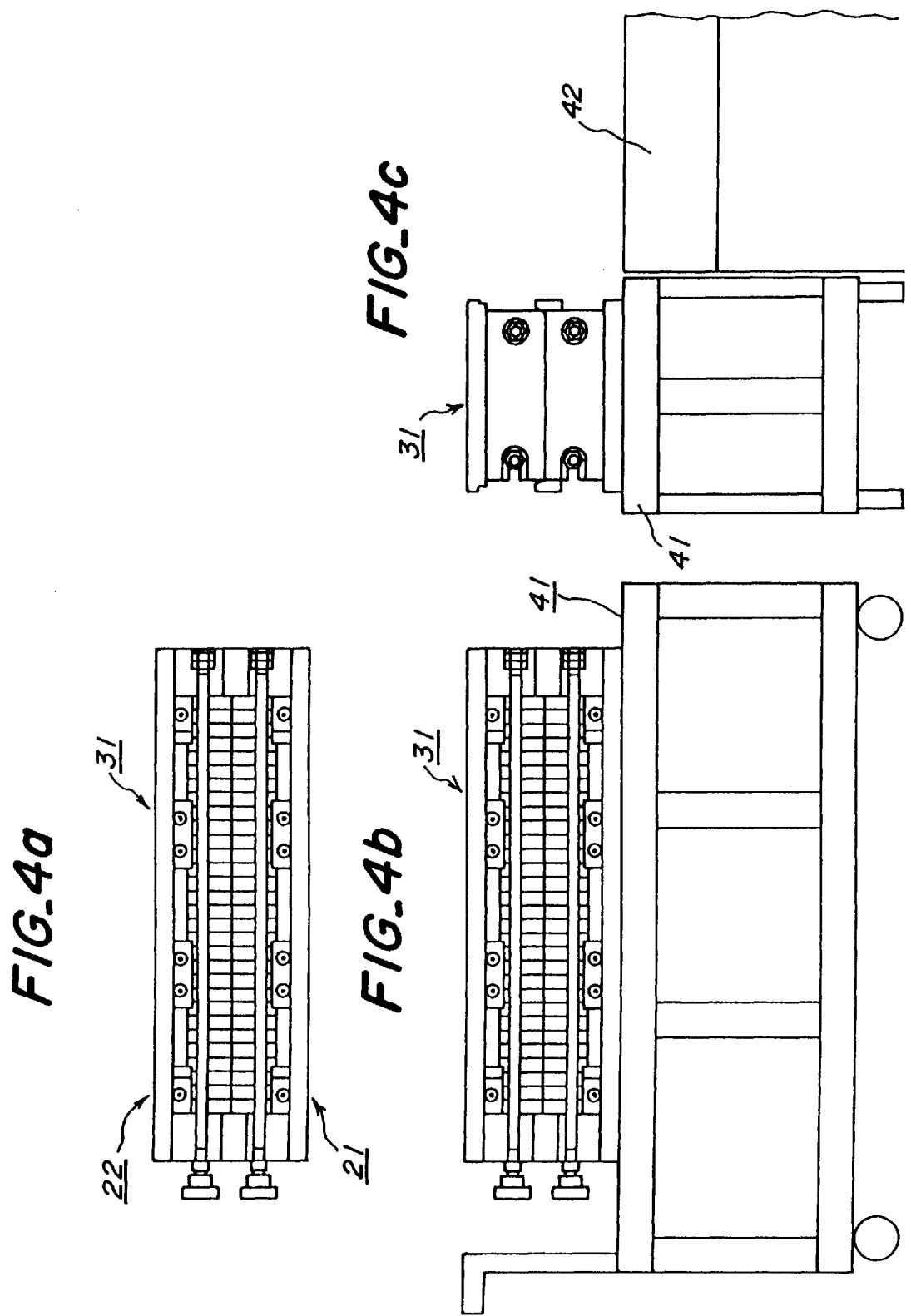

FORMING DIE AND MANAGING METHOD THEREOF

BACKGROUND OF THE INVENTION

1. Field of the Invention

The present invention relates to a forming die having an upper die member and a lower die member, which are constructed respectively by a plurality of segments and a managing method thereof.

2. Description of Related Art

A forming die for forming an insulation overcoat member of a polymer insulator, is constructed using a forming die having an upper die member and a lower die member each constructed respectively by a plurality of segments. FIG. 5 is a schematic view showing one embodiment of a known forming die. In the embodiment shown in FIG. 5, a forming die 51 comprised of an upper die member 52 and a lower die member 53 as illustrated, wherein the upper die member 52 and the lower die member 53 are constructed respectively by securing a plurality of segments 54 by mean of a tie-rod 55. Numeral 56 designates a cavity for forming a forming material such as silicone rubber into a predetermined shape.

Generally, installation or breaking down of the forming die 51 to a press apparatus is performed as follows. At first, ten pieces of the segments 54 are defined as one module of 0.6 m unit. The modules are transferred to the press apparatus in such a manner that a plurality of modules are arranged to form the lower die member 53 on the press apparatus. Then, in the same manner, a plurality of modules are arranged on the lower die member 53 one by one to form the upper die member 52. When all the segments 54 are arranged, the upper die member 52 and the lower die member 53 are respectively secured in an integral manner by means of the tie-rod 55. Subsequently, in order to install the forming die 51 to the press apparatus, the upper die member 52 is fixed to an upper platen of the press apparatus such that the upper and a lower ram heads are closed. Then, the lower die member 53 is fixed to a lower platen of the press apparatus.

Using the method described above, it is possible to assemble the forming die 51 having the upper die member 52 and the lower die member 53 each constructed by a plurality of segments 54 and to install the forming die 51 to the press apparatus. However, when forming a product having a length of 3 m or more the assembling operation of the forming die 51 and the installing operation of the forming die 51 to the press apparatus takes a long time. Moreover, it is necessary to perform the assembly and installation when the press apparatus is stopped. Therefore, equipment operation performance is lowered. In addition, in the assembled upper die member 52 and the assembled lower die member 53, a deviation between segments 54 is prevented only by the securing power of the tie-rod 55. Therefore, an up and down deviation and a right and left deviation between segments 54 sometimes does occur. If a product is formed by using such a forming die 51, a projection portion and a depression portion are generated on the formed product. In this case, it is necessary to repair such a projection or depression portion, or not to use the formed product as a complete product. Further, in order to eliminate the drawbacks mentioned above, it is sometimes necessary to re-assemble the forming die 51, thereby decreasing equipment operation performance again.

SUMMARY OF THE INVENTION

It is therefore, an object of the present invention to eliminate the drawbacks mentioned above and to provide a forming die which can be exchanged easily and smoothly and does not lower equipment operation performance, and a managing method thereof.

According to the present invention, a forming die having an upper die member and a lower die member, which are constructed respectively by a plurality of segments, comprises die-setting holders in which a predetermined number of segments are integrally arranged to form said upper die member and said lower die member.

Moreover, according to the present invention, a method of managing a forming die having an upper die member and a lower die member, which are constructed respectively a plurality of segments, comprises a step of performing an install or an uninstall of the forming die to a press apparatus by installing or uninstalling the upper die member and the lower die member, in which a predetermined number of segments are respectively integrated by using a die-setting holder, as a unit.

In the present invention, a predetermined number of segments are integrated by using the die-setting holder to form the upper die member and the lower die member. Therefore, it is possible to assemble the forming die or to install or uninstall the forming die to the press apparatus, as a unit of the upper die member or the lower die member which is integrated by the die-setting holder. In this case, a forming die exchanging operation can be performed easily and smoothly. In addition, it is possible to prepare a plurality of sets of the upper die member and the lower die member, which are respectively integrated by the die-setting holder having a necessary size within that of the press apparatus, beforehand. With the present invention, if the forming die exchanging operation is requested, it is necessary to exchange only the upper die member and the lower die member which are integrated by the die-setting holder having a necessary size, and thus equipment operation performance is not lowered. Moreover, it is possible to easily assemble the upper die member and the lower die member only by arranging a predetermined number of segments on the die-setting holder. Therefore, it is possible to shorten the time required for assembling the upper die member and the lower die member. Further, since the die-setting holder can hold the segments to form the upper die member or the lower die member, it is possible to eliminate deviation between segments. In addition, in the event that the die-setting holder having a high stiffness has a die member positioning means serving as a positioning between the upper die member and the lower die member, it is possible to eliminate the repairing operation due to a deviation between the upper die member and the lower die member, and thus to eliminate a generation of defective products.

BRIEF DESCRIPTION OF THE DRAWIWNGS

FIGS. 1a and 1b are schematic views respectively showing one embodiment of a die-setting holder used for a forming die according to the invention;

FIGS. 2a and 2b are schematic views respectively illustrating one embodiment of a segment used for the forming die according to the invention;

FIGS. 3a and 3b are schematic views respectively depicting one embodiment of a lower die member used for the forming die according to the invention;

FIGS. 4a, 4b and 4c are schematic views respectively explaining a managing method of the forming die according to the invention.

DESCRIPTION OF THE PREFERRED EMBODIMENT

Figure 5:
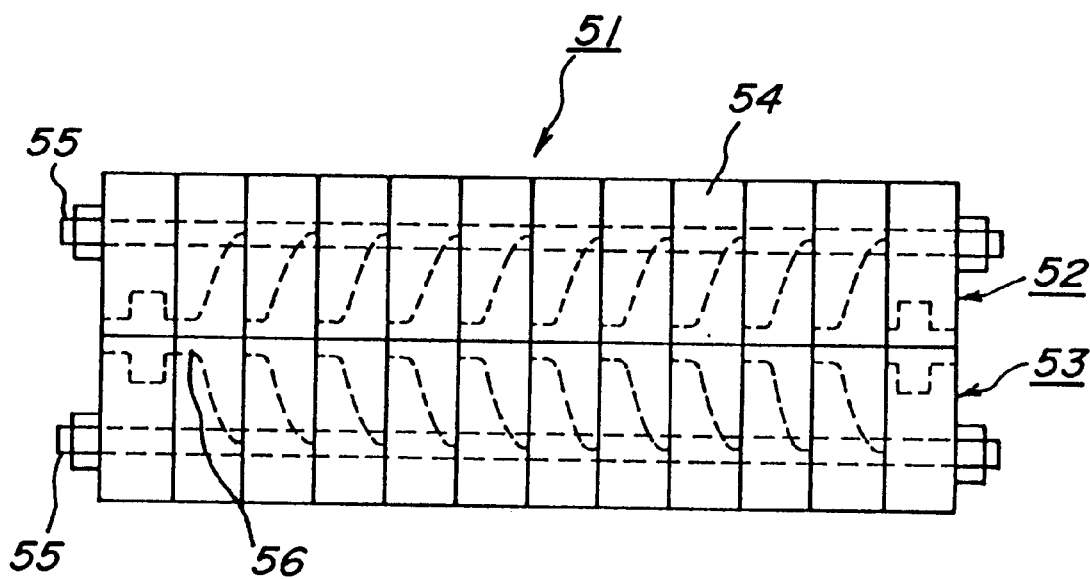
FIG. 5 is a schematic view showing one embodiment of a known forming die.

FIGS. 1a and 1b are a front view and a side view respectively showing one embodiment of a die-setting holder used for a forming die according to the invention. Moreover, FIGS. 1a and 1b show a die-setting holder for a lower die member. In this embodiment, a die-setting holder 1 shown in FIGS. 1a and 1b comprises a main substrate 2 of the die-setting holder 1, a fixing substrate 3, a movable substrate 4, a tie-rod 5, a positioning fixing plate 6, a positioning movable plate 7, a press member 8 and a projection portion 9. The fixing substrate 3 is arranged upright on one end of the main substrate 2. The movable substrate 4 is arranged upright on the other end of the main substrate 2 which is opposed to the fixing substrate 3. The tie-rod 5 fixes the fixing substrate 3 and the movable substrate 4 at two points. The positioning fixing plate 6 is used for positioning a plurality of segments, arranged in a long side direction in which the tie-rod 5 is extended on the main substrate 2, along a short side direction of the main substrate 2. The positioning movable plate 7 is used for positioning and fixing the segments along a short side direction of the main substrate 2 together with the positioning fixing plate 6. The press member 8 is used for pressing the positioning movable plate 7 toward the positioning fixing plate 6. The projection portion 9 is used for positioning an upper die member and a lower die member in which a predetermined number of segments are arranged between the fixing substrate 3 and the movable substrate 4 of the die-setting holder 1.

FIGS. 2a and 2b are a front view and a side view respectively showing one embodiment of a segment used for the forming die according to the invention. In the embodiment shown in FIGS. 2a and 2b, a segment 11 comprises an upper segment 11-1 and a lower segment 11-2 and has a cavity 12 arranged corresponding to a product to be formed. In FIG. 2, four through holes 13 are formed in the upper segment 11-1 and the lower segment 11-2. These through holes 13 are used for fixing a plurality of segments 11 and are not used for passing the tie-rod 5 therethrough in the die-setting holder 1. However, if positions of the positioning fixing plate 6 and the positioning movable plate 7 are varied, it is possible to design that the tie-rod 5 may be passed through the through hole 13 of the segment 11.

FIGS. 3a and 3b are a front view and a cross sectional view cut along b—b line showing one embodiment of a lower die member used for the forming die according to the invention. In the embodiment shown in FIGS. 3a and 3b, only a lower die member 21 is shown, but an upper die member has the substantially same construction as that of the lower die member 21 except that no projection portion 9 is arranged. The lower die member 21 shown in FIG. 3 is constructed by integrating a plurality of segments 11 shown in FIGS. 2a and 2b in the die-setting holder 1 shown in FIGS. 1a and 1b.

Then, a segment integrating operation will be explained. At first, in the embodiment shown in FIGS. 1a and 1b, one of the two tie-rods 5 is set between the fixing substrate 3 and the movable substrate 4, and a predetermined number of segments 11 are set on the die-setting holder 1. In this case, a positioning of the segment 11 along a long side direction of the die-setting holder 1 is performed in such a manner that the segment 11 is set from a side of the fixing substrate 3 and is completely contacted to the fixing substrate 3. At the same time or then, a positioning of the segments 11 along a short side direction of the segments 11 along a short side direction of the die-setting holder 1 is performed in such a manner that the segment 11 is set by pressing it completely to the positioning fixing plate 6. After all the segments 11 are set on the die-setting holder 1, the positioning movable plate 7 is moved toward the positioning fixing plate 6 by rotating a bolt 8a of the press member 8 so as to fix the segments 11 along a short side direction of the die-setting holder 1. Then, the remaining tie-rod 5 is set between the fixing substrate 3 and the movable substrate 4. After that, the tie-rods 5 are tightened by means of nuts 5a so as to move the movable substrate 4 toward the fixing substrate 3. When there is no gap between the movable substrate 4 and the fixing substrate 3, the tie-rods 5 are further tightened so as to fix the segments 11 along a long side direction of the die-setting holder 1. In this manner, the lower die member 21 shown in FIGS. 3a and 3b are obtained.

In the forming die according to the invention, as shown in FIGS. 3a and 3b, a plurality of segments 11 are integrated by means of the die-setting holder 1 to form the lower die member 21 (upper die member not shown). This is a feature of the invention. In the embodiment mentioned above, the projection portion 9 constructs a die member positioning means serving as a positioning between the upper die member and the lower die member. Moreover, a pair of the fixing substrate 3 and the movable substrate 4, and a combination of the positioning fixing plate 6, the positioning movable plate 7 and the press member 8 construct a segment positioning means serving as a positioning between segments when they are integrally arranged.

FIGS. 4a, 4b and 4c are schematic views respectively illustrating one embodiment of a managing method of the forming die according to the invention. FIGS. 4a, 4b and 4c show a managing method in the case of installing the forming die to the press apparatus, and this managing method will be explained according to FIGS. 4a, 4b and 4c. At first, as shown in FIG. 4a, the thus prepared lower die member 21 and upper die member 22 are connected to form a forming die 31. Then, as shown in FIG. 4b, the thus formed forming die 31 is transferred by means of a die transferring flatcar 41. After that, as shown in FIG. 4c, the die transferring flatcar 41 is positioned by a press apparatus 42. At this stage, the forming die 31 is installed to the press apparatus 42. In the managing method of the forming die according to the invention, since the managing is performed by the integrated upper die member and the integrated lower die member as a unit, it is possible to prepare the forming die 31 beforehand at need. Therefore, it is not necessary to assemble the forming die under such a condition that the press apparatus is stopped as the known managing method, and thus it is possible to exchange the forming die, i.e., install or uninstall the forming die to or from the press apparatus easily and smoothly.

As clearly understood from the above explanations, according to the invention, since a predetermined number of segments are integrated by using the die-setting holder to form the upper die member and the lower die member, it is possible to assemble the forming die or to install or uninstall the forming die to the press apparatus, as a unit of the upper die member or the lower die member which is integrated by the die-setting holder. In this case, a forming die exchanging operation can be performed easily and smoothly, and thus an equipment operation performance is not lowered. Moreover, it is possible to easily assemble the upper die member and the lower die member only by arranging a predetermined number of segments on the die-setting holder. In addition, in the case that the die-setting holder having a high stiffness has a die member positioning means serving as a positioning between the upper die member and the lower die member, it is possible to eliminate a repairing operation due to a deviation between the upper die member and the lower die member, and to eliminate a generation of defective products.

What is claimed is:

1. A forming die comprising:

an upper die member and a lower die member each having a main substrate extending in a first longitudinal direction;

a fixing substrate located on one end of said main substrate;

a movable substrate located on an opposite end of said main substrate and being movable along said main substrate in said first longitudinal direction;

a plurality of die forming segments situated between said movable substrate and said fixing substrate; and tie rods extending along said main substrate outside the periphery of said plurality of die forming segments, said tie rods connecting said movable substrate and said fixing substrate to one another.

2. The forming die according to claim 1, wherein each die member further comprises positioning means for positioning the upper and lower die members relative to one another.

3. The forming die according to claim 1, wherein each die member further comprises segment positioning means for laterally aligning the plurality of die forming segments on each respective die member.

4. The forming die according to claim 3, wherein said segment positioning means comprises a fixing plate arranged along one longitudinal side of said main substrate and a moving plate arranged along the opposite longitudinal side of said main substrate, wherein opposite sides of said die forming segments engage said fixing plate and said moving plate, respectively.

5. The forming die according to claim 4, wherein said moving plate is moveable toward and away from said fixing plate.

6. The forming die according to claim 1, wherein said tie rods position said die forming segments along said longitudinal direction of said main substrate.

* * * * *